United States Patent
Olson

(10) Patent No.: US 9,632,606 B1
(45) Date of Patent: Apr. 25, 2017

(54) ITERATIVELY ADJUSTING ESTIMATED TOUCH GEOMETRIES OF ESTIMATED TOUCHES TO SEQUENTIAL ESTIMATED ACTUAL TOUCHES

(71) Applicant: Parade Technologies, Ltd., Santa Clara, CA (US)

(72) Inventor: Dana Olson, Kirkland, WA (US)

(73) Assignee: PARADE TECHNOLOGIES, LTD., Santa Clara, CA (US)

(*) Notice: Subject to any disclaimer, the term of this patent is extended or adjusted under 35 U.S.C. 154(b) by 61 days.

(21) Appl. No.: 13/693,905

(22) Filed: Dec. 4, 2012

Related U.S. Application Data

(60) Provisional application No. 61/674,604, filed on Jul. 23, 2012.

(51) Int. Cl.
G06F 3/041 (2006.01)

(52) U.S. Cl.
CPC .................. G06F 3/041 (2013.01)

(58) Field of Classification Search
CPC ....... G06F 3/044; G06F 3/0416; G06F 3/0418
USPC .................. 345/173–175; 178/18.06
See application file for complete search history.

(56) References Cited

U.S. PATENT DOCUMENTS

| | | | |
|---|---|---|---|
| 4,733,222 A | 3/1988 | Evans | |
| 7,499,039 B2 | 3/2009 | Roberts | |
| 7,683,890 B2 | 3/2010 | Geaghan | |
| 8,040,142 B1* | 10/2011 | Bokma et al. | 324/658 |
| 8,279,189 B2 | 10/2012 | Yilmaz | |
| 8,487,896 B1* | 7/2013 | Brown | G06F 3/0418 345/173 |
| 2006/0026521 A1* | 2/2006 | Hotelling et al. | 715/702 |
| 2008/0012838 A1 | 1/2008 | Rimon | |
| 2009/0174675 A1* | 7/2009 | Gillespie et al. | 345/173 |
| 2010/0060608 A1* | 3/2010 | Yousefpor | 345/174 |
| 2010/0078230 A1* | 4/2010 | Rosenblatt et al. | 178/18.01 |
| 2010/0193258 A1 | 8/2010 | Simmons | |

(Continued)

FOREIGN PATENT DOCUMENTS

WO 2012121652 A1 9/2012

OTHER PUBLICATIONS

Sakaguchi, Y. (Oct. 2-5, 1994) "Haptic Recognition System with Sensory Integration and Attentional Perception," IEEE international Conference on MFI '94 pp. 288-295 (Abstract Only).

(Continued)

*Primary Examiner* — Jennifer Mehmood
*Assistant Examiner* — James Nokham
(74) *Attorney, Agent, or Firm* — Morgan, Lewis & Bockius LLP

(57) ABSTRACT

Apparatuses and methods of touch location interpolation using iterative emulated touches are described. One method measures touch data on a sense array. The method determines that the touch data represents two or more touches proximate to the sense array and sequentially estimates touch geometries of the two or more touches based on two or more estimated touches that correspond to the two or more touches proximate to the sense array. The touch geometries comprise estimated touch sizes and estimated touch positions of the two or more touches. The method outputs the touch geometries of the two or more touches when an error between the two or more estimated touches and the two or more touches is less than a specified threshold.

20 Claims, 5 Drawing Sheets

(56) References Cited

U.S. PATENT DOCUMENTS

| | | | |
|---|---|---|---|
| 2010/0258360 A1 | 10/2010 | Yilmaz | |
| 2011/0057670 A1* | 3/2011 | Jordan | 324/679 |
| 2011/0069029 A1* | 3/2011 | Ryu et al. | 345/173 |
| 2011/0102333 A1* | 5/2011 | Westerman | 345/173 |
| 2011/0134067 A1 | 6/2011 | Joguet | |
| 2011/0310040 A1 | 12/2011 | Ben-Shalom | |
| 2012/0105357 A1* | 5/2012 | Li et al. | 345/174 |
| 2012/0235936 A1* | 9/2012 | Yeh | G06F 3/0416 345/173 |
| 2012/0287054 A1* | 11/2012 | Kuo et al. | 345/173 |

OTHER PUBLICATIONS

Search Report for "Touch Location Interpolation Using Emulated Touches", dated Oct. 2012, 6 pages.

\* cited by examiner

ITERATIVELY ADJUSTING ESTIMATED TOUCH GEOMETRIES OF ESTIMATED TOUCHES TO SEQUENTIAL ESTIMATED ACTUAL TOUCHES

RELATED APPLICATIONS

This application claims the benefit of U.S. Provisional Application No. 61/674,604, filed Jul. 23, 2012, the entire contents of which are incorporated by reference herein.

TECHNICAL FIELD

The present disclosure relates generally to sensing systems, and more particularly to capacitance-sensing systems configurable to determine touch locations of touches on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
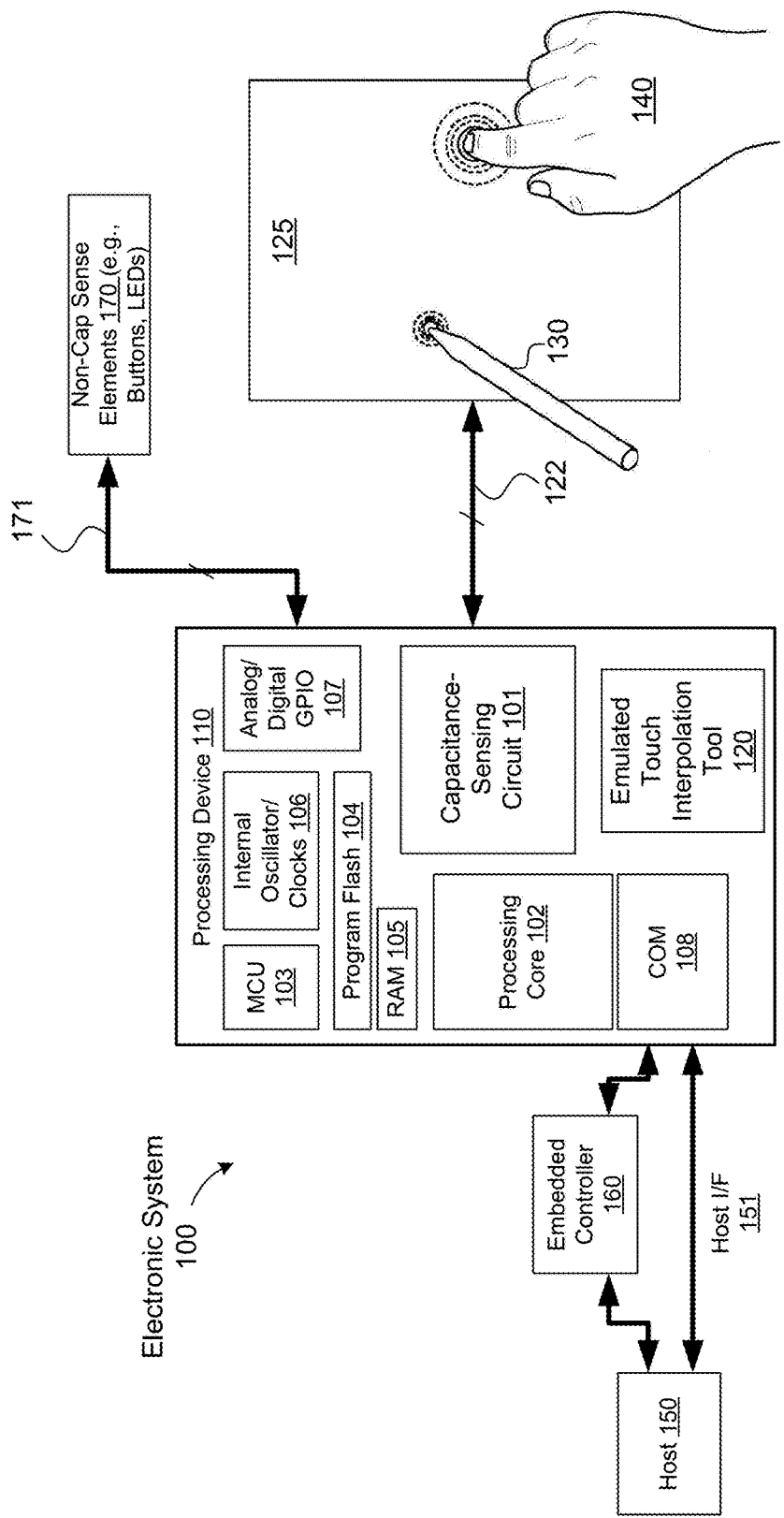
FIG. 1 is a block diagram illustrating one embodiment of an electronic system having a processing device, including a emulated touch interpolation tool.

FIG. 1 is a block diagram illustrating one embodiment of an electronic system 100 having a processing device 110, including a emulated touch interpolation tool 120. Details regarding the emulated touch interpolation tool 120 are described in more detail with respect to FIGS. 2-4. The processing device 110 is configured to detect one or more touches on a touch-sensing device, such as the capacitive sense array 125. The processing device can detect conductive objects, such as touch objects 140 (fingers or passive styluses, an active stylus 130, or any combination thereof. The capacitance-sensing circuit 101 can measure touch data on the capacitive sense array 125. The touch data may be represented as a multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

The emulated touch interpolation tool 120 performs multiple different peak-detection schemes on each of the multiple cells to generate a list of one or more possible peaks in the touch data, and selects one or more actual peaks from the list of one or more possible peaks. Each of the one or more actual peaks is used to determine a location of a touch proximate to the capacitive sense array 125. For example, the center of mass of the touches can be determined for the actual peaks determined by the emulated touch interpolation tool 120.

In another embodiment, the emulated touch interpolation tool 120 obtains a capacitive image of a capacitive sense array 125. The capacitive image includes multiple cells each with a capacitance value of an intersection of sense elements of the sense array 125. It should be noted that the emulated touch interpolation tool 120 can receive the raw capacitance value measured by the capacitive-sensing circuit 101 and then can compute a difference count, which is a difference between the raw capacitance value and a baseline capacitance value. Alternatively, the capacitance-sensing circuit 101 outputs the difference count to the emulated touch interpolation tool 120. The emulated touch interpolation tool 120 performs a first set of peak-detection checks for each of the multiple cells using a first peak-detection scheme to identify possible peaks, and performs a second set of peak-detection checks for each of the multiple cells using a second peak-detection scheme to identify additional possible peaks. The emulated touch interpolation tool 120 determines which of the possible peaks and additional possible peaks are valid peaks. The valid peaks are used to determine locations of actual touches proximate to the capacitive sense array 125.

In one embodiment, the emulated touch interpolation tool 120 is implemented in firmware of the processing device 110. In another embodiment, the emulated touch interpolation tool 120 is implemented in software, hardware, or any combination thereof. In another embodiment, the emulated touch interpolation tool 120 is implemented as part of a gesture recognition tool that calculates and reports gestures. In another embodiment, the peaks are calculated by the emulated touch interpolation tool 120 and sent as raw data to the host processor 150. In another embodiment, the emulated touch interpolation tool 120 can be implemented on the host, and the capacitive-sensing circuit 101 obtains the touch data and sends the touch data to the emulated touch interpolation tool 120 on the host processor 150. Alternatively, other configurations are possible as would be appreciated by one of ordinary skill in the art having the benefit of this disclosure. It should also be noted that the peaks and precise interpolated coordinates computed from the peaks may be used for gesture recognition in various application.

The embodiments described herein can compute the size and position of touches by conductive objects (e.g., fingers) resulting from a measured set of capacitance map values from a sense array of capacitive touch electrodes (also referred to as capacitive touch sensors). In particular, the embodiments solve for the size and position of one or more conductive objects on a sense array by repeatedly simulating capacitance map values for a simulated touches, and then using the difference between the measured and the simulated capacitance map to adjust the position and size of the simulated touch. The simulation is repeated until the error in the capacitance map values are minimized. Additional details of the computations by the emulated touch interpolation tool 120 are described below with respect to FIGS. 2-5.

The embodiments described herein regarding emulated touch interpolation can be used to detect two or more touches at minimal finger separation on any sensor array pattern. The embodiments described herein take advantage of symmetry of a standard peak-detection algorithm to make a more robust algorithm that uses a voting scheme to determine which peak, if any, are valid. The embodiments described herein can be used for touchscreens, touchpads, or other devices having sensing surfaces.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual capacitance sensing techniques, self capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination.

In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance-sensing circuit 101 does not use mutual capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Existing algorithms solve for a finger position directly from a set of capacitance measurements from a low-resolution sense array. To function correctly, the calculation must first associate a set of measured values with an individual touch by a finger and then a centroid, or another similar calculation, is used to find the center of the finger touching the set of excited electrodes. Due to the low resolution of the capacitance sense array (large electrode size relative to small closely spaced fingers) multiple fingers may overlap an individual sense elements. The single cycle forward direction calculation (peak detection and centroid) does not lend itself to resolving how to share touch data between two or more fingers.

Figure 2:
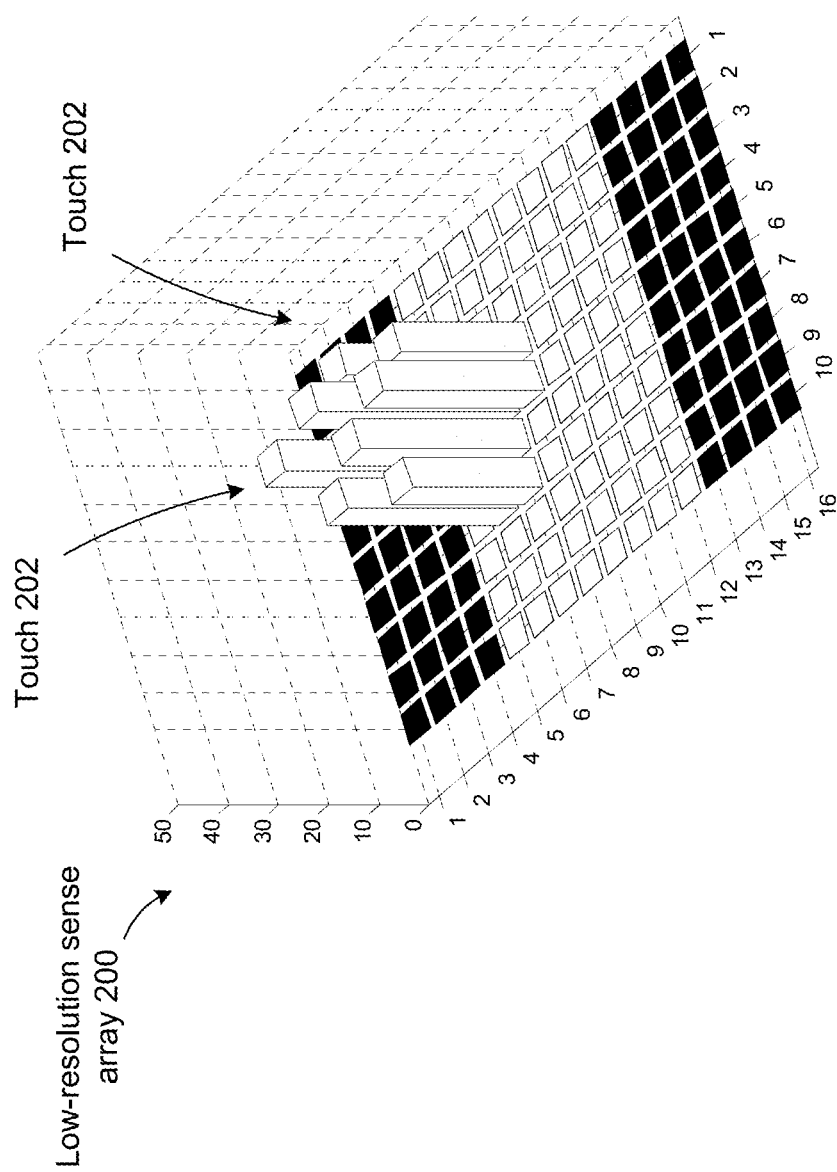
FIG. 2 illustrates a three-dimensional diagram of measured capacitance values of two touches proximate to a low-resolution capacitive sense array according to one embodiment.
Figure 3:
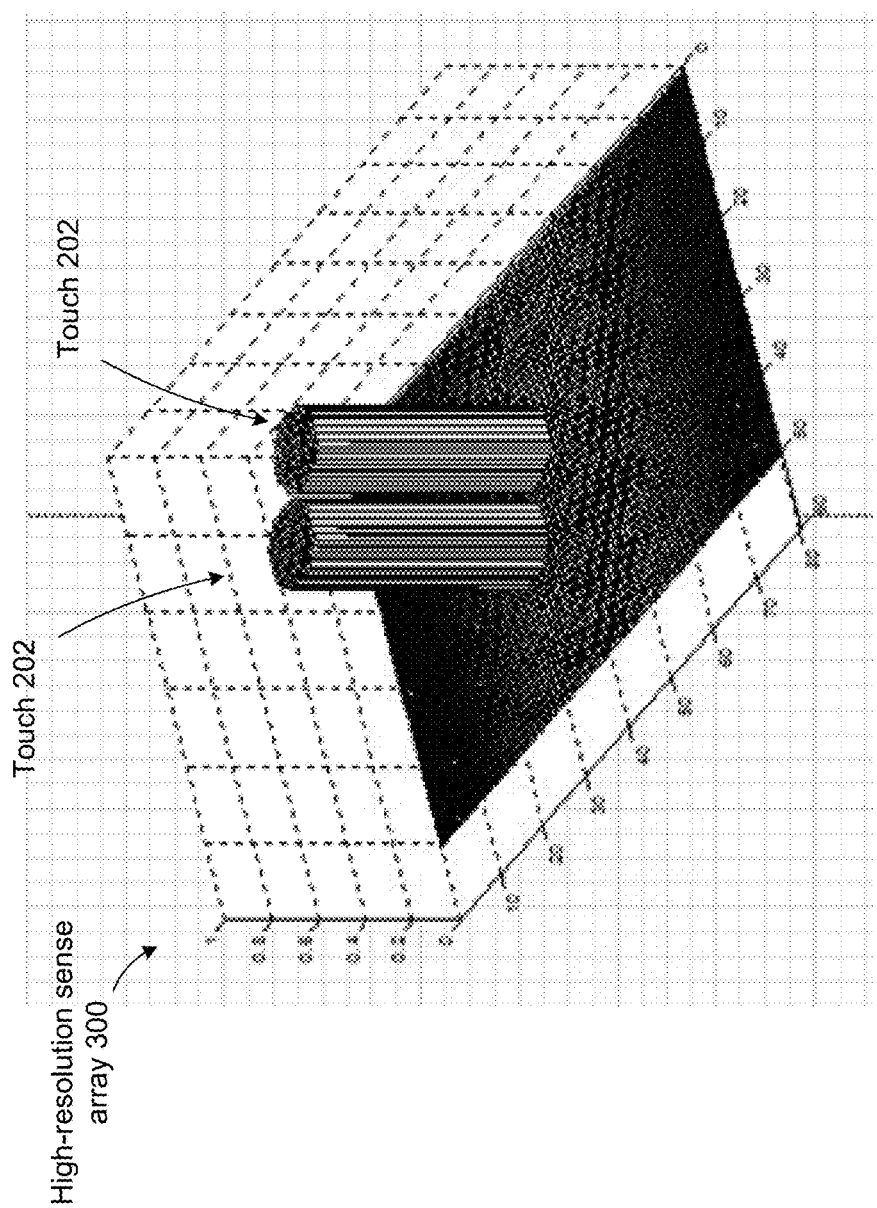
FIG. 3 illustrates a three-dimensional diagram of measured capacitance values of two touches proximate to a high-resolution capacitive sense array according to one embodiment.

Conventionally, the size and position of one or more touches is difficult to determine from a set of signals from a low resolution sense array. FIG. 2 illustrates a three-dimensional diagram of measured capacitance values of two touches 202 proximate to a low-resolution capacitive sense array 200 according to one embodiment. The two touches 202 in FIG. 2 are exemplary finger signals from two circular touches. In the low-resolution data, the size and position of the touches 202 are obscured. The same circular touches 202 would be easy to find in a high-resolution sense array as illustrated in FIG. 3. FIG. 3 illustrates a three-dimensional diagram of measured capacitance values of the two touches 202 proximate to a high-resolution capacitive sense array 300 according to one embodiment.

Typically, the size and position of the touches 202 are determined from the low-resolution sense array 200 data using local peak values and a centroid calculation, or other interpolation method, is used to resolve the position of the touches 202 to a higher resolution than the sensor pitch. The embodiments described herein iteratively solve the reverse problem. It is relatively simple to estimate the low-resolution data values for a touch or set of touches.

The embodiments described herein can compute the size and position of touches by conductive objects (e.g., fingers) resulting from a measured set of capacitance map values from a sense array of capacitive touch electrodes (also referred to as capacitive touch sensors). In particular, the embodiments solve for the size and position of one or more conductive objects on a sense array by repeatedly simulating capacitance map values for a simulated touches, and then using the difference between the measured and the simulated capacitance map to adjust the position and size of the simulated touch. The simulation is repeated until the error in the capacitance map values are minimized. In one embodiment, given a touch geometry, such as a circle, oval or other simple forms, the signals of the electrodes covered by a touch can be estimated. The estimated signal map of a touch panel can then be compared against a measured signal map of the touch panel. The difference between the estimated map and the measured map can be used to adjust the estimated touch geometry so as to improve the matching between the estimated signals and the measured signals. When the matching is sufficiently close, the position of the touches on the panel can be assumed to be those of the estimated touches that produce the same values in the simulation. One calculation sequence is illustrated and described with respect to FIG. 4. Alternatively, other methods may be used to measure the signals of one or more touches and sequentially simulate the touches to determine a position, size, orientation or other characteristics of the touches.

Figure 4:
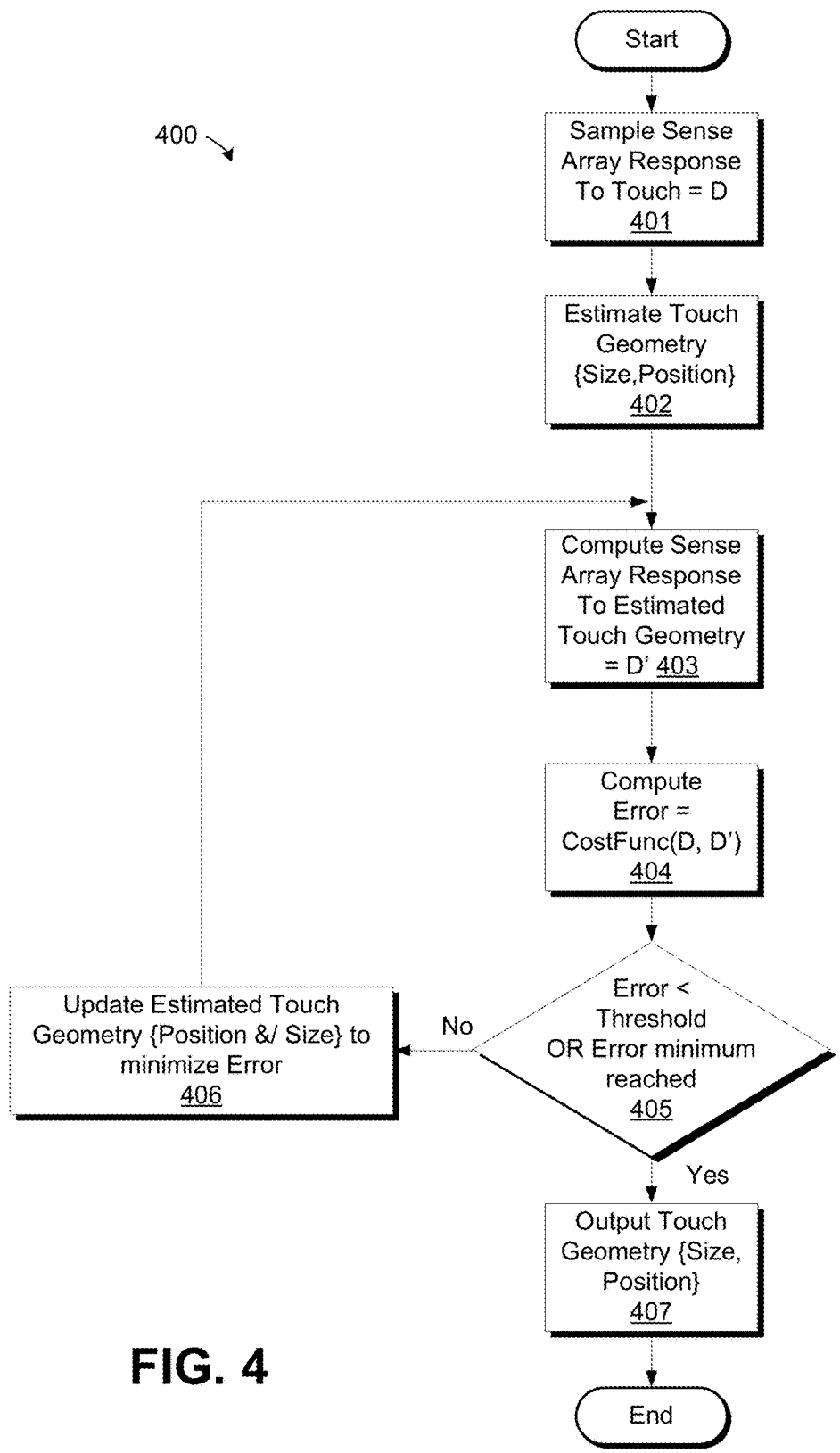
FIG. 4 is a flow diagram of a method of emulated touch interpolation for determining touch locations according to an embodiment.

FIG. 4 is a flow diagram of a method 400 of emulated touch interpolation for determining touch locations according to an embodiment. The method 400 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 400. In another embodiment, the emulated touch interpolation tool 120 performs the method 400. Alternatively, other components of the electronic system 100 perform some or all of the operations of method 400.

Referring to FIG. 4, the method 400 begins with processing logic collecting a set of capacitance measurements from a touch sensor array (block 401). From the measurements, the processing logic determines a rough size and position of the touches (block 402). The previous position of touches may be used to improve the initial position estimate, if the system samples fast enough such that touches move a small distance between each measurement, for example. The processing logic can produce estimated measurements of the touches by computing an area of each sense element covered by the touch geometry determined in block 402 (block 403). This calculation may be accomplished by first creating a high-resolution bit map image of the touch geometry as illustrated in FIG. 3. The bit map image is then compared with the geometry of each sense element and the number of image pixels within each sense element area is counted. The pixel count is then interpreted as the signal strength due to the touch for the sense element. A more precise estimate could be computed by integrating the sense element and finger overlap area using calculus and the mathematical descriptions of the sense element and finger areas.

Once the processing logic computes the estimated response to the estimated touch geometry at block 403 (e.g., Estimated Sensor Values D' have been computed), the processing logic computes a difference between the estimated values and the measured values (block 404) (e.g., equation (1) Erij=Dij−Dij'). Many numeric optimization algorithms are available to minimize a single cost value as a function of one or more inputs. To use one of these algorithms, the error can be summarized into a single number using a cost function. A typical cost function could be as shown in equation (2): Cost=sum (Erij2). If the Cost value is sufficiently low, the calculation is complete, such as if the error is less than a threshold or when an error minimum is reached (block 405). On the first iteration this is not likely, and the Cost value is used by an optimization algorithm to select a new Estimated Sensor Geometry (block 406). In one embodiment, an applicable multivariable optimization algorithm used in the prototype is the Nelder-Mead simplex (direct search) method. Alternatively, other optimization algorithms may be used. All such methods vary a set of parameters, often over a constrained range so as to minimize a cost function. The Nelder-Mead algorithm appears in Matlab as the fminsearch( ) function, for example.

In one embodiment at block 401, the processing logic collects a capacitive image of measured values. The capacitive image may include multiple cell values representation the capacitances of the intersections of a capacitive sense array. In one embodiment, the processing logic calculates the different counts, which are the differences between the raw counts of the intersections and the baselines of the intersections. In another embodiment, the processing logic receives the different counts from a different circuit or routing executing on the processing device. Similarly, at block 403, the processing logic can compute an estimate capacitive image, which can be compared against the capacitive image of measured values to compute the error at block 404.

In a further embodiment, the sense array is a capacitive sense array, and each of the multiple cells includes a capacitance value of an intersection of sense elements in the capacitive sense array. In another embodiment, the sense array is an optical sense array, and the cell values represent the values measured by an optical sensing device. Alternatively, the emulated touch interpolation embodiments described herein of may be used in other sensing systems, such as, for example, a system that creates a digitized heat map using reflected light.

The methods described above regarding emulated touch interpolation can be implemented by the emulated touch interpolation tool 120, which may be implemented in a capacitive touch screen controller. In one embodiment, the capacitive touch screen controller is the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touch-screen controllers sensing technology to resolve touch locations of multiple fingers and a stylus on the touch-screens, supports leading operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In another embodiment, the processing logic can execute the following routine at block 404.

```
function[cost]=costFunc(argList)
global diffMeas sensorPitch;
x=argList(1);
y=argList(2);
r=argList(3);
[rows, cols]=size(diffMeas);
diffModel=simPanel(x, y, r, rows, cols, sensorPitch);
errorModel=(diffMeas−diffModel);
cost=sum(sum(errorModel.*errorModel));
end
```

In another embodiment, the processing logic can execute the following routine at block 403.

```
function [diff]=simPanel(Fx_mm, Fy_mm, Fdiam, rows,
    cols, sensorPitch)
% Finger size and spacing.
Fr=Fdiam/2; % Finger radii
% Simulation bitmap resolution.
```

```
xres=0.5; % mm Computation pitch
yres=0.5;
maxDiffCounts=100; % Value for fully covered sensor.
% Scale to 100 diff counts max
gain=maxDiffCounts/(sensorPitch/xres*sensorPitch/
    yres);
k=0.5;
% Initialize sensor array.
simRows=rows*sensorPitch/yres;
simCols=cols*sensorPitch/xres;
screen=zeros(simRows, simCols);
[simRows, simCols]=size(screen);
diff=zeros(rows, cols);
% Determine where circular fingers cover the simulation
    array.
for i=1: simRows,
    for j=1: simCols,
        y=i*yres; % test location coordinates in mm.
        x=j*xres;
        screen(i,j)=covered(x, y, Fx_mm, Fy_mm, Fr);
        % finger 1
    end
end
ii=0;
% Sum array values for each sensor element.
nPerRow=fix(sensorPitch/yres);
nPerCol=fix(sensorPitch/xres);
for i=1:nPerRow:simRows,
    ii=ii+1;
    jj=0;
    for j=1:nPerCol:simCols,
        jj=jj+1;
        subSums=sum(screen(i:(i+nPerRow-1),j:(j+nPer-
            Col-1)));
        diff(ii,jj)=gain*sum(subSums);
    end
end
function [inside]=covered(x, y, Fx, Fy, Fr)
% function [inside]=covered(x, y, Fx, Fy, Fr)
% Determines if a circle centered at Fx, Fy with
% radius Fr, covers location x,y
    distSqr=(x-Fx)^2+(y-Fy)^2;
    inside=distSqr<=Fr^2;
end
```

In another embodiment, the processing logic can execute the following routine for block 401-407.

```
% Measured value
diffMeas=simPanel(xTouch(index),    yTouch(index),
    rTouch, rows, cols, sensorPitch)
global sensorPitch diffMeas;
% Minimize cost function by varying touch position and
    size
X=fminsearch(@costFunc,[2.5, yTouch(index)+2, 9]);
```

In another embodiment of the method, the processing logic measures a first set of touch data on a sense array. The processing logic determines that the touch data represents two or more touches proximate to the sense array. The processing logic sequentially estimates touch geometries of the two or more touches based on two or more estimated touches that correspond to the two or more touches proximate to the sense array. The touch geometries include estimated touch sizes and estimated touch positions of the two or more touches. The processing logic outputs the touch geometries of the two or more touches when an error between the two or more estimated touches and the two or more touches is less than a specified threshold.

In a further embodiment, the processing logic sequentially estimates the touch geometries by 1) determining a second set of estimated touch data based on the estimated touch geometries of the two or more estimated touches, 2) determining a difference between the first set of touch data and the second set of estimated touch data, and 3) adjusting estimated touch geometries of the two or more estimated touches when the difference is greater than a specified threshold (e.g., a specified minimum error threshold).

In another embodiment, the processing logic sequentially estimates the touch geometries by 1) determining a subsequent set of estimated touch data based on the adjusted touch geometries when the difference is greater than the specified threshold, 2) determining a subsequent difference between the subsequent set of estimated touch data and a previous set of estimated touch data, and 3) iteratively updating the estimated touch geometries of the two or more estimated touches until the subsequent difference is less than the specified threshold.

In another embodiment, the processing logic determines touch orientations of the two or more touches based on the first set of touch data and the second set of estimated touch data and outputs the touch orientations when the error between the two or more estimated touches and the two or more touches is less than the specified threshold.

In another embodiment, the sense array is a capacitive sense array. Each of the cells of the capacitive sense array includes a capacitance value of an intersection of sense elements in the capacitive sense array. In a further embodiment, the first set of touch data is represented as multiple cells that each correspond to the intersections of the capacitive sense array. In a further embodiment, at least two of the two or more touches overlap on at least one of the intersections.

In another embodiment of the method, the processing logic obtains a first capacitive image of a capacitive sense array. The capacitive image includes multiple cells each with a capacitance value of an intersection of sense elements of the capacitive sense array. The processing logic identifies at least two touches proximate to the capacitive sense array based on the first capacitive image and estimates a subsequent capacitive image based on estimated geometries of at least two estimated touches that correspond to the at least two touches. The processing logic iteratively adjusts the estimated geometries of the at least two estimated touches and iteratively determines the subsequent capacitive image based on the adjusted geometries until an error between the subsequent capacitive image and the first capacitive image is less than a specified threshold. The processing logic outputs touch geometries of the at least two touches. These touch geometries include touch sizes and touch positions of the two or more touches. In another embodiment, the processing logic iteratively adjusts the estimated geometries includes adjusting at least one parameter of at least one of the estimated touches.

In a further embodiment, the processing logic selects a set of two or more circles of a predefined size for the at least two estimated touches. In another embodiment, the processing logic selects a first circular touch for one of the at least two estimated touches, estimates a first diameter or radius of the first circular touch based on the first set of touch data. For example, an approximate width or projected width can be determined from the touch data. The processing logic selects a second circular touch for one of the at least two estimated touches and estimates a second diameter or radius of the second circular touch based the first set of touch data.

In another embodiment, the processing logic estimates a first coordinate of the first circular touch based on the first set of touch data and estimates a second coordinate of the second circular touch based on the first set of touch data. In a further embodiment, the processing logic iteratively adjusts the touch geometries by adjusting at least one of the first diameter or radius, second diameter or radius, first coordinate or second coordinate. In another embodiment, the processing logic iteratively adjusts the touch geometries by adjusting at least one of a first aspect ratio of first circular touch or a second aspect ratio of the second circular touch. In a further embodiment, the processing logic iteratively adjusts the touch geometries by adjusting at least one of a first touch orientation of first circular touch or a second touch orientation of the second circular touch.

In another embodiment, the processing logic can enhance the estimation techniques described above by keeping a history of touch number and sizes. For example, keeping a history can be used to find the position of a touch that is only partially overlapping the sense array, such as a touch that is at the edge of the sense array. If the size of the touch is known from the history, or based on an assumption such as the width, or height of the touch, the estimation technique can accurately determine the position of the touch that is at the edge of the sense array. The history can also be used with constrained optimization to find the position of two closely spaced touches where the touches both partially cover one or more sense elements. The embodiments described herein may be used where the problem has no simple or closed form forward solution, but a simple reverse solution is known. The reverse solution may be iteratively solved to produce the forward solution. The embodiments described herein may provide enhanced resolution finger position when fingers (or other conductive objects) are small, closely spaced or only partially overlapping the sensor array, as described herein.

The embodiments described above are discussed in scenarios where there are two touches detected on the sense array, however, the embodiments may also be used in scenarios where there is one touch, as well as three or more touches. Also, the estimation techniques may be used when the two or more touches are close together, such as when at least two touches overlap at least one sense element, as well as when the two or more touches are farther apart. Also, the embodiments described herein can be used when one or more touches are at the edge of the sensor array. For example, a partial touch may be detected at the edge of the sense array and the estimation techniques described herein can be used to determine the touch geometry, including the touch size position for the partial touch.

Figure 5:
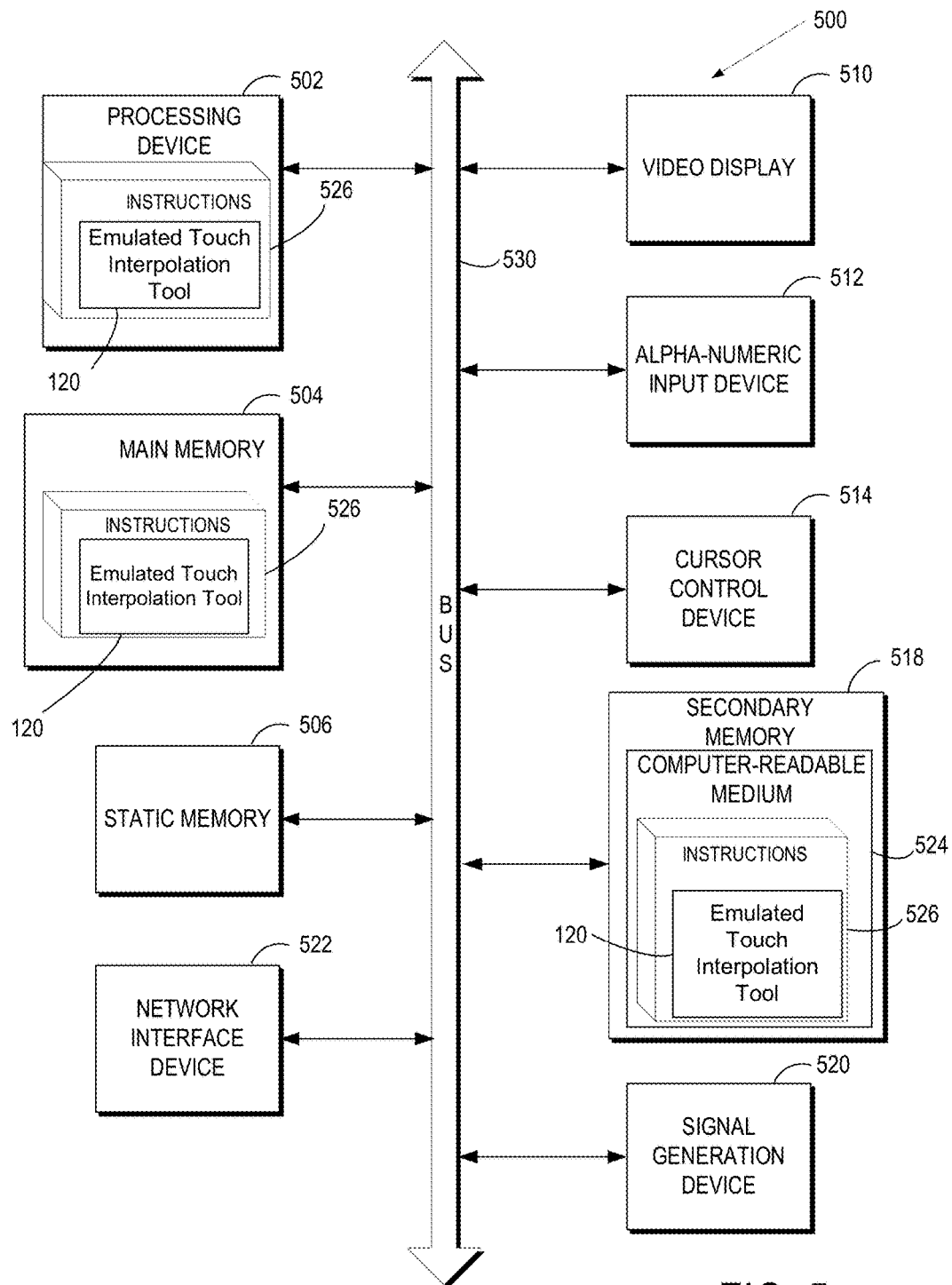
FIG. 5 is a diagram of one embodiment of a computer system for emulated touch interpolation.

FIG. 5 is a diagram of one embodiment of a computer system for emulated touch interpolation. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502 (e.g., host processor 150 or processing device 110 of FIG. 1), a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configurable to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the emulated touch interpolation tool 120. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination of hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    measuring, at a processing device, a first set of actual touch data from an actual response of a low-resolution sense array;
    determining that the first set of actual touch data represents two or more concurrent actual touches proximate to the sense array, each of the concurrent actual touches having a respective actual touch geometry including a touch position and a touch size, wherein the actual touch geometries associated with the concurrent actual touches are obscured in the first set of actual test data from the low-resolution sense-array;
    obtaining estimated touch geometries of two or more concurrent simulated touches proximate to the sense array that correspond to the two or more actual touches with the associated actual touch geometries;
    sequentially estimating the actual touch geometries of the two or more concurrent actual touches by iteratively computing an estimated response of the sense array to the two or more concurrent simulated touches and adjusting the estimated touch geometries to approximate the actual touch geometries based on an error between the estimated response and the actual response, wherein the estimated touch geometries include a set of estimated touch sizes and estimated touch positions of the two or more concurrent simulated touches, and wherein the actual touch geometries are distinct from the estimated touch geometries and the two or more actual touches are distinct from the two or more concurrent simulated touches; and
    outputting the actual touch geometries of the two or more actual touches based on the estimated touch geometries when the error is less than a specified threshold, thereby resolving the actual touch geometries associated with the concurrent actual touches that were obscured in the first set of actual test data.

2. The method of claim 1, wherein the sequentially estimating the actual touch geometries comprises:
    determining a second set of estimated touch data based on the estimated response;
    determining the error based on a difference between the first set of actual touch data and the second set of estimated touch data; and
    adjusting the estimated touch geometries of the two or more concurrent simulated touches when the difference is greater than the specified threshold.

3. The method of claim 2, wherein the sequentially estimating the actual touch geometries further comprises:
    determining a subsequent set of estimated touch data based on the adjusted estimated touch geometries when the difference is greater than the specified threshold;
    determining a subsequent difference between the subsequent set of estimated touch data and a previous set of estimated touch data; and
    iteratively updating the estimated touch geometries of the two or more estimated touches until the subsequent difference is less than the specified threshold.

4. The method of claim 2, further comprising:
    determining actual touch orientations of the two or more actual touches based on the first set of actual touch data and the second set of estimated touch data; and
    outputting the actual touch orientations when the error between the two or more estimated touches and the two or more actual touches is less than the specified threshold.

5. The method of claim 1, wherein the sense array is a capacitive sense array, and wherein the actual response and the estimated response each include a plurality of cells each with a capacitance value of an intersection of sense elements of the capacitive sense array.

6. The method of claim 5, wherein at least two of the two or more actual touches overlap on at least one of the intersections.

7. A method comprising:
    obtaining, at a processing device, a first capacitive image of a low-resolution capacitive sense array, wherein the capacitive image comprises a plurality of cells each with a capacitance value of an intersection of sense elements of the capacitive sense array;
    identifying existence of at least two concurrent actual touches proximate to the capacitive sense array based on the first capacitive image, each of the concurrent actual touches having a respective actual touch geometry including a touch position and a touch size, wherein the actual touch geometries associated with the concurrent actual touches are obscured in the first set of actual test data from the low-resolution sense-array;
    computing an estimated capacitive image based on estimated touch geometries of at least two concurrent simulated touches that correspond to the at least two actual touches with the associated actual touch geometries;
    iteratively adjusting the estimated touch geometries of the at least two concurrent simulated touches and iteratively determining the estimated capacitive image based on the adjusted estimated touch geometries until an error between the estimated capacitive image and the first capacitive image is less than a specified threshold; and
    outputting the actual touch geometries of the at least two concurrent actual touches, wherein the actual touch geometries include a set of touch sizes and touch positions of the at least two actual touches, and wherein the actual touch geometries are different from the estimated touch geometries and the at least two actual touches are different from the at least two concurrent simulated touches, thereby resolving the actual touch geometries associated with the concurrent actual touches that were obscured in the first set of actual test data.

8. The method of claim 7, wherein the iteratively adjusting the estimated touch geometries comprises adjusting at least one parameter of at least one of the estimated touches.

9. The method of claim 7, further comprising selecting a set of two or more circles of a predefined size for the at least two estimated touches.

10. The method of claim 7, further comprising:
    selecting a first circular touch for one of the at least two concurrent simulated touches;
    estimating a first diameter or radius of the first circular touch based on the first capacitive image;
    selecting a second circular touch for one of the at least two concurrent simulated touches; and
    estimating a second diameter or radius of the second circular touch based the first capacitive image.

11. The method of claim 10, further comprising:
    estimating a first coordinate of the first circular touch based on the first capacitive image; and
    estimating a second coordinate of the second circular touch based on the first capacitive image.

12. The method of claim 11, wherein the iteratively adjusting the estimated touch geometries comprises adjusting at least one of the first diameter or radius, second diameter or radius, first coordinate or second coordinate.

13. The method of claim 11, wherein the iteratively adjusting the estimated touch geometries comprises adjusting at least one of a first aspect ratio of first circular touch or a second aspect ratio of the second circular touch.

14. The method of claim 13, wherein the iteratively adjusting the estimated touch geometries comprises adjusting at least one of a first touch orientation of first circular touch or a second touch orientation of the second circular touch.

15. An apparatus comprising:
a memory; and
a processing element coupled to the memory, wherein the processing element is configurable to:
    obtain a first set of actual touch data of a low-resolution sense array;
    determine that the first set of actual touch data represents two or more concurrent actual touches proximate to the sense array, each of the concurrent actual touches having a respective actual touch geometry including a touch position and a touch size, wherein the actual touch geometries associated with the concurrent actual touches are obscured in the first set of actual test data from the low-resolution sense-array;
    obtain estimated touch geometries of two or more concurrent simulated touches proximate to the sense array that correspond to the two or more actual touches with the associated actual touch geometries;
    sequentially estimate the actual touch geometries of the two or more concurrent actual touches by iteratively computing an estimated response of the sense array to the two or more concurrent simulated touches and adjusting the estimated touch geometries to approximate the actual touch geometries based an error between the estimated response and the actual response and adjusting the estimated touch geometries to approximate the actual touch geometries based an error between the estimated response and the actual response, wherein the estimated touch geometries include a set of estimated touch sizes and estimated touch positions of the two or more concurrent simulated touches, and wherein the actual touch geometries are distinct from the estimated touch geometries and the two or more actual touches are distinct from the two or more concurrent simulated touches; and
    output the actual touch geometries of the two or more concurrent actual touches based on the estimated touch geometries when the error is less than a specified threshold, thereby resolving the actual touch geometries associated with the concurrent actual touches that were obscured in the first set of actual test data.

16. The apparatus of claim 15, wherein the processing element is further configurable to:
    determine a second set of estimated touch data based on the estimated touch estimated response;
    determine the error based on a difference between the first set of actual touch data and the second set of estimated touch data; and
    adjust the estimated touch geometries of the two or more concurrent simulated touches when the difference is greater than the specified threshold.

17. The apparatus of claim 16, wherein the processing element is further configurable to:
    determine a subsequent set of estimated touch data based on the adjusted estimated touch geometries when the difference is greater than the specified threshold;
    determine a subsequent difference between the subsequent set of estimated touch data and a previous set of estimated touch data; and
    iteratively update the estimated touch geometries of the two or more estimated touches until the subsequent difference is less than the specified threshold.

18. The apparatus of claim 16, wherein the processing element is further configurable to:
    determine actual touch orientations of the two or more actual touches based on the first set of actual touch data and the second set of estimated touch data; and
    output the actual touch orientations when the error between the two or more estimated touches and the two or more actual touches is less than the specified threshold.

19. The apparatus of claim 15, further comprising the sense array, wherein the sense array is a capacitive sense array, and wherein the capacitive image comprises a plurality of cells each with a capacitance value of an intersection of sense elements of the capacitive sense array.

20. The apparatus of claim 15, further comprising the sense array, wherein the sense array is an optical sense array.

* * * * *